US011561716B2

(12) United States Patent
Jain et al.

(10) Patent No.: US 11,561,716 B2
(45) Date of Patent: Jan. 24, 2023

(54) FAST MIGRATION OF METADATA

(71) Applicant: Cohesity, Inc., San Jose, CA (US)

(72) Inventors: Sachin Jain, Fremont, CA (US); Venkatesh Pallipadi, Campbell, CA (US); Sharath Kumar Naeni, Santa Clara, CA (US)

(73) Assignee: Cohesity, Inc., San Jose, CA (US)

( * ) Notice: Subject to any disclaimer, the term of this patent is extended or adjusted under 35 U.S.C. 154(b) by 246 days.

(21) Appl. No.: 17/111,076

(22) Filed: Dec. 3, 2020

(65) Prior Publication Data

US 2021/0181968 A1  Jun. 17, 2021

Related U.S. Application Data

(63) Continuation of application No. 16/270,257, filed on Feb. 7, 2019, now Pat. No. 10,891,067, which is a continuation of application No. 16/101,091, filed on Aug. 10, 2018, now Pat. No. 10,254,996.

(51) Int. Cl.
| | | |
|---|---|---|
| *G06F 16/00* | (2019.01) | |
| *G06F 3/06* | (2006.01) | |
| *G06F 16/17* | (2019.01) | |
| *G06F 16/23* | (2019.01) | |
| *G06F 11/14* | (2006.01) | |
| *G06F 16/21* | (2019.01) | |

(52) U.S. Cl.
CPC ......... *G06F 3/0647* (2013.01); *G06F 3/0604* (2013.01); *G06F 11/14* (2013.01); *G06F 16/1734* (2019.01); *G06F 16/214* (2019.01); *G06F 16/2358* (2019.01); *G06F 3/067* (2013.01)

(58) Field of Classification Search
CPC .................. G06F 16/1734; G06F 16/2358
See application file for complete search history.

(56) References Cited

U.S. PATENT DOCUMENTS

| | | |
|---|---|---|
| 5,842,208 A | 11/1998 | Blank |
| 8,700,683 B2 | 4/2014 | Cooney et al. |
| 9,037,556 B2 | 5/2015 | Castellano |
| 10,254,996 B1 | 4/2019 | Jain |
| 2013/0332608 A1 | 12/2013 | Shiga |
| 2016/0034356 A1 | 2/2016 | Aron |
| 2016/0210302 A1 | 7/2016 | Feng |

(Continued)

OTHER PUBLICATIONS

Hao Liu et al., "LibreKV: A Persistent In-Memory Key-Value Store," IEEE Transactions Emerging Topics In Computing, Dec. 7, 2017, pp. 916-927, Dec. 7, 2017. (Year: 2017).*

(Continued)

*Primary Examiner* — Cheryl Lewis
(74) *Attorney, Agent, or Firm* — Van Pelt, Yi & James LLP

(57) ABSTRACT

One or more buckets of key-value pairs of a first node of a distributed storage system are selected to be migrated to a second node of the distributed storage system. One or more underlying database files corresponding to the one or more selected buckets are identified. The one or more identified underlying database files are directly copied from a storage of a first node to a storage of the second node. The copied underlying database files are linked in a database of the second node to implement the one or more selected buckets in the second node.

20 Claims, 12 Drawing Sheets

(56) References Cited

U.S. PATENT DOCUMENTS

2016/0321294 A1 11/2016 Wang
2016/0321295 A1 11/2016 Dalton

OTHER PUBLICATIONS

Decandia et al., "Dynamo: Amazon's Highly Available Key-Value Store", SOSP'07, Oct. 14-17, 2007, ACM, pp. 205-220 (Year: 2007).
Li et al., "LocoFS: A Loosely-Coupled Metadata Service for Distributed File Systems", ACM Reference, Nov. 12-17, 2017, pp. 1-12. (Year: 2017).
Qin et al., "Optimizing Data Migration for Cloud-Based Key-Value Stores", Copyright 2012, ACM, pp. 2204-2208. (Year: 2012).

* cited by examiner

300

| $K_1$ | $V_1$ | — 301 |
| --- | --- | --- |
| $K_2$ | $V_2$ | — 302 |
| ooo | ooo | |
| $K_n$ | $V_n$ | — 303 |

Figure 3

FAST MIGRATION OF METADATA

CROSS REFERENCE TO OTHER APPLICATIONS

This application is a continuation of U.S. patent application Ser. No. 16/270,257, entitled FAST MIGRATION OF METADATA filed Feb. 7, 2019, now U.S. Pat. No. 10,891,067, which is incorporated herein by reference for all purposes, which is a continuation of U.S. patent application Ser. No. 16/101,091, entitled FAST MIGRATION OF METADATA filed Aug. 10, 2018, now U.S. Pat. No. 10,254,996, which is incorporated herein by reference for all purposes.

BACKGROUND OF THE INVENTION

A distributed computer system includes software components on multiple computers coupled to a network. The multiple computers communicate and coordinate actions by passing messages to each other over the network. Each networked computer or node generally has its own memory and local data store.

Key-value stores are an effective way to manage data, as they are not based on relational tables and structured query languages. Essentially, a key-value store is a large dictionary. Providing the key-value store with a key allows the update or return of a value, where the value can be data of almost any type, thus making the key-value store adaptable to a variety of applications.

A distributed computer system may include a file system for managing the data files accessible by the multiple computers or nodes in the distributed system. File systems rely on metadata (information about the data in the file system) to find and modify data in the file system.

BRIEF DESCRIPTION OF THE DRAWINGS

Various embodiments of the invention are disclosed in the following detailed description and the accompanying drawings.

FIG. 3 is a diagram illustrating an embodiment of a bucket.

DETAILED DESCRIPTION

Figure 1:
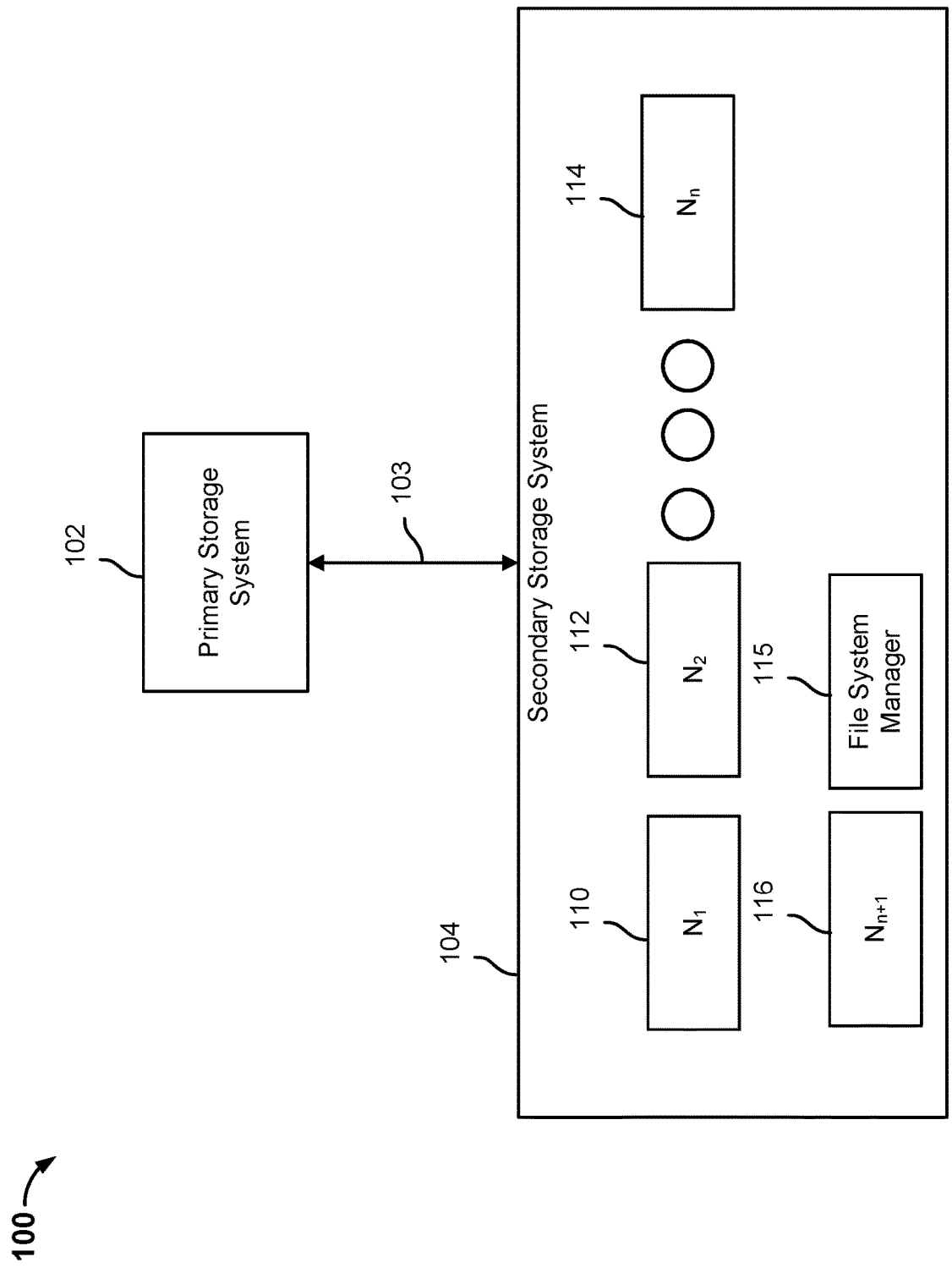
FIG. 1 is a block diagram illustrating an embodiment of a distributed computing system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A distributed computer system may be comprised of a plurality of computer nodes and may be configured to store file system data across the plurality of computer nodes. The file system data includes a plurality of content files and their associated metadata. The metadata associated with the plurality of content files may be organized using a snapshot tree (e.g., Cohesity Snaptree®) and stored in a key-value store (KVS). A snapshot tree is a tree data structure comprised of a root node, one or more levels of intermediate nodes, and a plurality of leaf nodes. A leaf node of the snapshot tree may be configured to store a key-value pair of metadata. The key-value pairs of metadata (e.g., log sequence numbers, file name, creation date, offline/online status, etc.) may be stored in the KVS. The distributed computer system may be configured to store the KVS across the plurality of computer nodes. The key-value pairs of the KVS may be grouped into a plurality of buckets. Each node of the plurality of storage nodes includes a local KVS that stores a portion of the KVS, i.e., at least one of the plurality of buckets.

The plurality of storage nodes are configured to be fault tolerant and consistent. Fault-tolerance means that the distributed KVS continues to provide access to values in the KVS in spite of a certain number of node failures. Thus, a key-value pair is stored in at least two of the local key-value stores. Consistency means that the replicated key values of the KVS on the other nodes are the same when read from the KVS. One example of consistency is read-after-read (RAR) consistency. RAR consistency means that any two successive reads will return the same value, unless, and only unless, a write operation occurred between the two reads. Another example of consistency is read-after-write (RAW)

consistency. RAW consistency means that any read after a successful write operation will return the value written by the write operation.

Distributing keys over the storage nodes may use a system for mapping portions of the KVS to each computing node. A hashing mechanism may be used to determine to which node a given key-value pair should be written. Each key is consistently hashed to a bucket. A bucket is comprised of a plurality of key-value pairs. A bucket corresponds to a particular underlying database file. For example, the KVS and associated buckets are managed and stored using a database. The database may be stored as one or more underlying database files. A bucket maps to one of the underlying database files of the database, that is, the key-value pairs of a bucket are stored in one of the underlying database files. Each computing node is configured to store one or more buckets. In some embodiments, the buckets are configured to store the same number of key-value pairs. In other embodiments, the buckets are configured to store different numbers of key-value pairs. In some embodiments, each of the storage nodes stores the same number of buckets. In other embodiments, due to the size of a computing node, a computing node of the plurality of storage nodes may store a different number of buckets than another computing node of the plurality of storage nodes.

When a node is added to the distributed computing system, the key-values are redistributed among the nodes. A node may be added to the distributed computing system to improve load balancing of the distributed computing system. This improves load balancing of the distributed computing system because file operations are less likely to be concentrated at a particular node. In some embodiments, the buckets are redistributed among the nodes so that each node primarily serves 1/(N+1) of the total buckets where N is the number of nodes. A node may be added to the distributed computing system because the size of the file system data is increasing. A node may also be added to the distributed computing system to improve the fault tolerance of the distributed computing system.

Conventionally, the keys of a computing node to be redistributed (e.g., when a target node is added, to improve load balancing, to improve fault tolerance) may be identified by scanning a local database to identify all the keys associated with a bucket. A node may scan the database for a database file corresponding to the bucket and package the entries (e.g., the key-value pairs of the bucket) of the database file into a message. The key-value pairs of a bucket may be transferred to the target node via one or more messages. The size of a message is finite. Key-value pairs of a bucket that are not included in an initial message may be included one or more additional messages that are sent to the target node. In response to receiving the messages that include the key-value pairs, the target node opens the message, reads the message, and updates its own database by writing the key-value pairs included in the message to its database. This process may take a long time to perform (e.g., hours) due to the large size of a database.

A technique to reduce the amount of time to add and configure a node to the distributed computing system is disclosed. The distributed computing system is comprised of a plurality of nodes. Each node is configured to store a plurality of buckets. Each bucket is comprised of a plurality of key-value pairs. A bucket corresponds to a particular underlying database file. For example, the KVS and associated buckets are managed and stored using a database. The database may be stored as one or more underlying database files. A bucket maps to one of the underlying database files of the database, that is, the key-value pairs of a bucket are stored in one of the underlying database files. One or more buckets of key-value pairs that are stored across the plurality of nodes are selected to be migrated to the target node. The one or more underlying database files corresponding to the one or more selected buckets are identified.

Updates to the one or more identified database files are suspended while the one or more identified database files are transferred to the target node. While the one or more identified database files are being transferred to the target node, updates to the one or more identified database files are logged. This prevents the underlying database file from being modified while being migrated. File operations (e.g., read/write/delete) may continue to occur while the one or more identified files are being transferred. A read operation of a key-value pair stored in one of the selected buckets may be performed by a node that stores the key-value pair. A write or delete operation of a key-value pair stored in one of the selected buckets may be logged. This minimizes downtime of the database while the database is being updated.

After the transfer of the one or more identified database files to the target node is complete, the log is inspected. It is determined whether the number of entries in the log is less than a threshold number of updates. In the event the number of entries in the log is less than the threshold number of updates, updates to the one or more selected buckets are suspended and the one or more updates included in the log are transferred to the target node. In the event the number of entries in the log is not less than the threshold number of updates, then a new log is generated and the initial log is transferred to the target node. After the transfer of the one or more updates included in the initial log to the target node is completed, the new log is inspected to determine whether the number of entries in the log is less than the threshold number of updates. The process repeats itself until a retry threshold has been met. In the event a retry threshold has been met, the entries of the log, regardless of whether the threshold number of updates has been exceeded, are transferred to the target node. This ensures that the database is up-to-date at some point-in-time and not in a never ending loop of generating and transferring logs.

In response to receiving the one or more identified database files, the target node is configured to store the one or more identified database files and update its local KVS based on the one or more received database files. The KVS may be implemented as a log structured merge (LSM) database, which does not involve making a copy of the entire database. A hard link of the LSM files may be maintained to prevent the files from being deleted after any compaction. In some embodiments, the target node may receive one or more updates associated with the one or more received database files in the form of one or more logs. In response to receiving the one or more logs, the target node may update its local KVS based on the one or more entries of the one or more logs. For example, the one or more entries of the one or more logs may be applied to the one or more identified database files. After the file transfer is complete and the target node updates its local KVS, a master node of the plurality of nodes is configured to update a master table. The master table indicates which node of the plurality of nodes that should handle a file operation for a particular key-value pair. The master table is updated such that after a key-value pair has been migrated, the master table will include a pointer to the target node instead of the node on which the key-value pair was previously stored.

Such a technique may reduce the amount of time to add a target node to a distributed computing system. A node may be added to the distributed computing system for various reasons, such as to increase the fault tolerance of the distributed computing system, to expand the amount of data that the distributed computing system may back up, or to replace another node of the distributed computing system. Such reasons represent a transitional state of the distributed computing system. The technique described herein reduces the amount of time that the distributed computing system is in a transitional state.

FIG. 1 is a block diagram illustrating an embodiment of a distributed computing system. In the example shown, system 100 includes a primary storage system 102 and a secondary storage system 104 connected via a network 103.

The primary storage system 102 is a computing system that stores file system data. Primary storage system 102 may be comprised of one or more servers, one or more computing devices, one or more storage devices, and/or a combination thereof. The primary storage system may be used to implement a database application (e.g., SQL Server) and store one or more database files and one or more associated transaction log segments to the one or more storage volumes of primary storage system 102. Primary storage system 102 may perform a backup snapshot of the one or more storage volumes to secondary storage system 104. Instead of only backing up the data associated with a database application, the complete storage volume on which the data associated with the database application resides, may be backed up. A backup command from a backup agent may cause the database application to quiesce the database and to record the metadata associated with the database (e.g., log sequence numbers (LSN), one or more file names, a creation date, offline/online status, etc.). Quiescing the database before performing a backup ensures that the database is in a consistent state prior to backup.

The backup snapshot may be a full backup snapshot or an incremental backup snapshot. Each storage volume of the primary system is comprised of file system data. A full backup snapshot includes a copy of the entire file system data of the storage volume to be backed up. An incremental backup snapshot saves storage space as compared to the full backup snapshot by identifying and storing data changes since a previous backup snapshot (e.g., in creating the incremental backup only perform a copy of the file system data that is new or has changed since the previous backup snapshot). In some embodiments, by using a file system metadata snapshot tree, incremental backup snapshots are stored in a fully-hydrated manner that allows an incremental backup snapshot to be directly utilized much like a full backup snapshot to directly provide a complete view and access to protected data without the need to hydrate the incremental backup snapshot or access/combine with a previous full backup snapshot. For example, for a desired data not captured in an incremental backup snapshot because it was unchanged from a previous backup snapshot, the file system metadata snapshot tree corresponding to the incremental backup snapshot is created in a manner to store a link to an appropriate data portion of the previous backup snapshot that can be used to directly access the desired data.

Primary storage system 102 may be configured to backup file system data to secondary storage system 104 according to one or more backup policies. In some embodiments, a backup policy indicates that file system data is to be backed up on a periodic basis (e.g., hourly, daily, weekly, monthly, etc.). In other embodiments, a backup policy indicates that file system data is to be backed up when a threshold size of data has change. In other embodiments, a backup policy indicates that file system data is to be backed up upon a command from a user associated with primary storage system 102. The file system data may be sent from primary storage system 102 to secondary storage system 104 via a network 103. Network 103 may be one or more of the following: a local area network, a wide area network, a wired network, a wireless network, the Internet, an intranet, or any other appropriate communication network.

Secondary storage system 104 is configured to receive and backup file system data from primary storage system 102. Secondary storage system 104 may protect a large volume of applications while supporting tight business requirements (recovery time objective (RTO) and recovery point objective (RPO)). Secondary storage system 104 may unify end-to-end protection infrastructure—including target storage, provide backup, replication of data, disaster recover, and/or cloud tiering. Secondary storage system 104 may provide scale-out, globally deduped, highly available storage to consolidate all secondary data, including backups, files, and test/dev copies. Secondary storage system simplifies backup infrastructure and eliminates the need to run separate backup software, proxies, media servers, and archival. Secondary storage system 104 may be fully integrated with a virtual machine (VM) centralized management tool, such as vCenter, and an applications programming interface (API) for data protection. Secondary storage system may reduce the amount of time to perform a RPOs and support instantaneous RTOs by creating a clone of a backup VM and running the VM directly from secondary storage system 104. Secondary storage system 104 may integrate natively with one or more cloud servers. This eliminates the need to use tape archives by using one or more cloud servers for long-term data archival.

Data for the backup snapshot may be received at secondary storage system 104. Secondary storage system 104 is configured to store the file system data and organize the file system data in a tree data structure. An example of the tree data structure is a snapshot tree (e.g., Cohesity Snaptree®), which may be based on a B+ tree structure (or other type of tree structure in other embodiments). The backup snapshot may include a plurality of content files, such as one or more database files, one or more non-database files, and metadata associated with the content files. The secondary storage system may create a file system metadata snapshot tree for the backup snapshot. The metadata associated with the plurality of content files may be organized using a snapshot tree and stored in a KVS. The file system metadata snapshot tree for the backup snapshot corresponds to a version of the storage volume(s) at a particular moment in time. The secondary storage system may also create a file tree corresponding to a content file included in the backup snapshot. The file tree is a file metadata structure. The file tree may store the metadata associated with the file corresponding to the file tree. A leaf node of the file system metadata snapshot tree may include a pointer to one of the file trees, linking the contents of a content file to the file system metadata snapshot tree. A leaf node of a file tree may include a pointer to a brick storing one or more data chunks associated with a content file. A leaf node of the snapshot tree may be configured to store a key-value pair of metadata. The key-value pairs of metadata (e.g., log sequence numbers, file name, creation date, offline/online status, etc.) may be stored in the KVS.

A file system metadata snapshot tree is a tree data structure and is comprised of a root node, one or more levels of intermediate nodes, and one or more leaf nodes. In some embodiments, a file system metadata snapshot tree is comprised of a root node and one or more leaf nodes. The root node is the starting point of a file system metadata snapshot tree and may include pointers to one or more other nodes. The root node includes an identifier that indicates a view (e.g., backup snapshot) with which the root node is associated. An intermediate node is a node to which another node points (e.g., root node, other intermediate node) and includes one or more pointers to other nodes. A leaf node is a node at the bottom of a file system metadata snapshot tree. In some embodiments, a leaf node is configured to store key-value pairs of file system metadata associated with the storage volume(s). In some embodiments, a leaf node includes a pointer to a file tree. For example, a leaf node of a file system metadata snapshot tree storing metadata associated with the storage volume(s) may include a pointer to a root node of a file tree storing data associated with the database. In some embodiments, a leaf node of a file system metadata snapshot tree or a leaf node of a file tree includes a pointer to or an identifier of a physical location storing data. For example, the physical location may be a brick storing one or more data chunks and the identifier may be a brick number corresponding to the brick storing one or more data chunks of the content file. Each node of the tree structure includes an identifier of a that identifies view/backup snapshot (file system metadata snapshot tree or file tree) with which the node is associated (e.g., TreeID).

The tree data structure may be used to capture different versions of the storage volume(s) at different moments in time. A backup snapshot received from a primary system may include data associated with a first version of the storage volume(s) at a first point in time and a subsequent backup snapshot received from the primary system may include data associated with the second version of the storage volume(s) at a second point in time. Each version of the volume(s) may be represented in a corresponding file system metadata snapshot tree. The tree data structure allows a chain of file system metadata snapshot trees (i.e., each corresponding file system metadata snapshot tree) to be linked together by allowing a node of a later version of a file system metadata snapshot tree corresponding to a later version of the storage volume(s) to reference a node of a previous version of the file system metadata snapshot tree corresponding to an earlier version of the storage volume(s). The tree data structure allows a chain of file trees (i.e., each corresponding file tree) to be linked together by allowing a node of a later version of a file tree corresponding to a later version of a content file to reference a node of a previous version of the file tree corresponding to an earlier version of the content file.

Each time data for an incremental backup snapshot of the storage volume(s) is received, a new file system metadata snapshot tree is added to the corresponding tree data structure by creating a new root node. The new root node may be a clone of the root node associated with a previous file system metadata snapshot tree. Initially upon creation, the new root node includes the set of pointers included in the previous root node, that is, the new root node includes one or more pointers to an intermediate node or leaf node that was specified in the root node of a previous file system metadata snapshot tree associated with a previous backup. However, among other differences, the new root node includes a node identifier and a view identifier that is different than the node identifier and view identifier of the previous root node. The new file system metadata snapshot tree may be modified to reflect the data included in the backup of the storage volume(s) (e.g., adding one or more intermediate nodes, adding one or more leaf nodes, updating pointers associated with nodes).

A file system metadata snapshot tree is a representation of a fully hydrated backup because it provides a complete view of the storage volume(s) at a particular moment in time. Any file stored in the storage volume at a particular time and the file's contents, for which there is an associated backup, may be determined from the file system metadata snapshot tree, regardless if the associated backup snapshot was a full backup snapshot or an incremental backup snapshot. Creating an incremental backup snapshot may only include copying data of the storage volume(s) that was not previously backed up. However, the file system metadata snapshot tree corresponding to the incremental backup snapshot provides a complete view of the storage volume(s) at the particular moment in time because it includes references to data of the storage volume that was previously stored. This provides significant savings in the amount of time needed to restore or recover a storage volume and/or a database. In contrast, traditional recovery/restoration methods mount a full backup and the entirety of one or more subsequent incremental backups to create the particular version of the volume and/or database. The file system metadata snapshot tree also enables efficient retrieval of data values because each leaf node is the same number of levels away from the root node of the file system metadata snapshot tree, that is, the same number of computer transactions are used to access each leaf node of the file system metadata snapshot tree.

A fully hydrated database backup enables database restore, recovery, and cloning workflows to occur almost instantaneously (e.g., seconds) instead of taking a long period of time (e.g., hours) to perform. For example, a version of a database may be recovered to a specified location, a version of a database may be cloned to allow a testing/development system to make one or more database queries and/or test one or more changes to the database, or an entire virtual machine and a database may be restored to any particular point in time and copied to a specified location for disaster recovery or testing/development purposes.

Secondary storage system 104 may be comprised of one or more solid state drives, one or more hard disk drives, or a combination thereof. Secondary storage system 104 may include file system manager 115. File system manager 115 is configured to maintain file system data in the form of nodes arranged in a tree data structure. In some embodiments, leaf nodes in the file system tree include key-value pairs that associate data keys with values in the form of particular items of file system data. File system manager 115 may be configured to perform one or more modifications, as disclosed herein, to a snapshot tree. File system data may include data associated with one or more content files and metadata associated with the one or more content files. The metadata may include information, such as file size, directory structure, file permissions, physical storage location of the content files, time of last access, time of last modification, etc. The metadata values for the one or more content files may be stored in a KVS.

The secondary storage system 104 includes a first storage node 110, a second storage node 112, and a nth storage node 114. In some embodiments, n is an odd number. Each storage node may include a corresponding disk storage, a corresponding KVS, a corresponding processor, and a corresponding memory. Each storage node 110, 112, 114 maintains a portion of the KVS. The key-value pairs of the KVS may be grouped into a plurality of buckets. Each node of the plurality of storage nodes includes a local KVS that stores a portion of the KVS, i.e., at least one of the plurality of buckets. Keys may be assigned to a storage node using a hashing function that generally distributes keys equally across the nodes. A master node of the plurality of storage nodes may be configured to store a master table. The master table matches a key-value pair to a storage node. The secondary storage system may receive a file operation (e.g., write/read operation). The master node may inspect the master table and direct the file operation to the storage node associated with the file operation, i.e., the node that will handle the file operation.

At least one storage node in the secondary storage system may be designated as a backup node for the portion of the KVS that is stored on another storage node of the secondary storage system 104. For example first storage node 110 may store keys $k_{11}$ to $k_{1n}$. At least one copy of keys $k_{11}$ to $k_{1n}$ may be stored on the second storage node 112, the nth storage node 114, or any of the storage nodes between the second storage node 112 and the nth storage node 114. This provides fault tolerance and consistency for the distributed computing system in the event of a node failure. Multiple copies of keys may be stored across multiple storage nodes to increase the fault tolerance of the distributed computing system. In some embodiments, each key of the KVS is stored across a majority of the storage nodes.

Secondary storage system 104 may also include an n+1 storage node 116, which represents a storage node that has been added to secondary storage system 104. Node 116 may be added to secondary storage system to improve fault tolerance, load balancing, etc. of secondary storage system 104. Storage node 116 may also include a corresponding disk storage, a corresponding KVS, a corresponding processor, and a corresponding memory. When storage node 116 is added to the secondary storage system 104, a plurality of keys stored on storage nodes 110, 112, 114 may be migrated to node 116.

Figure 2A:
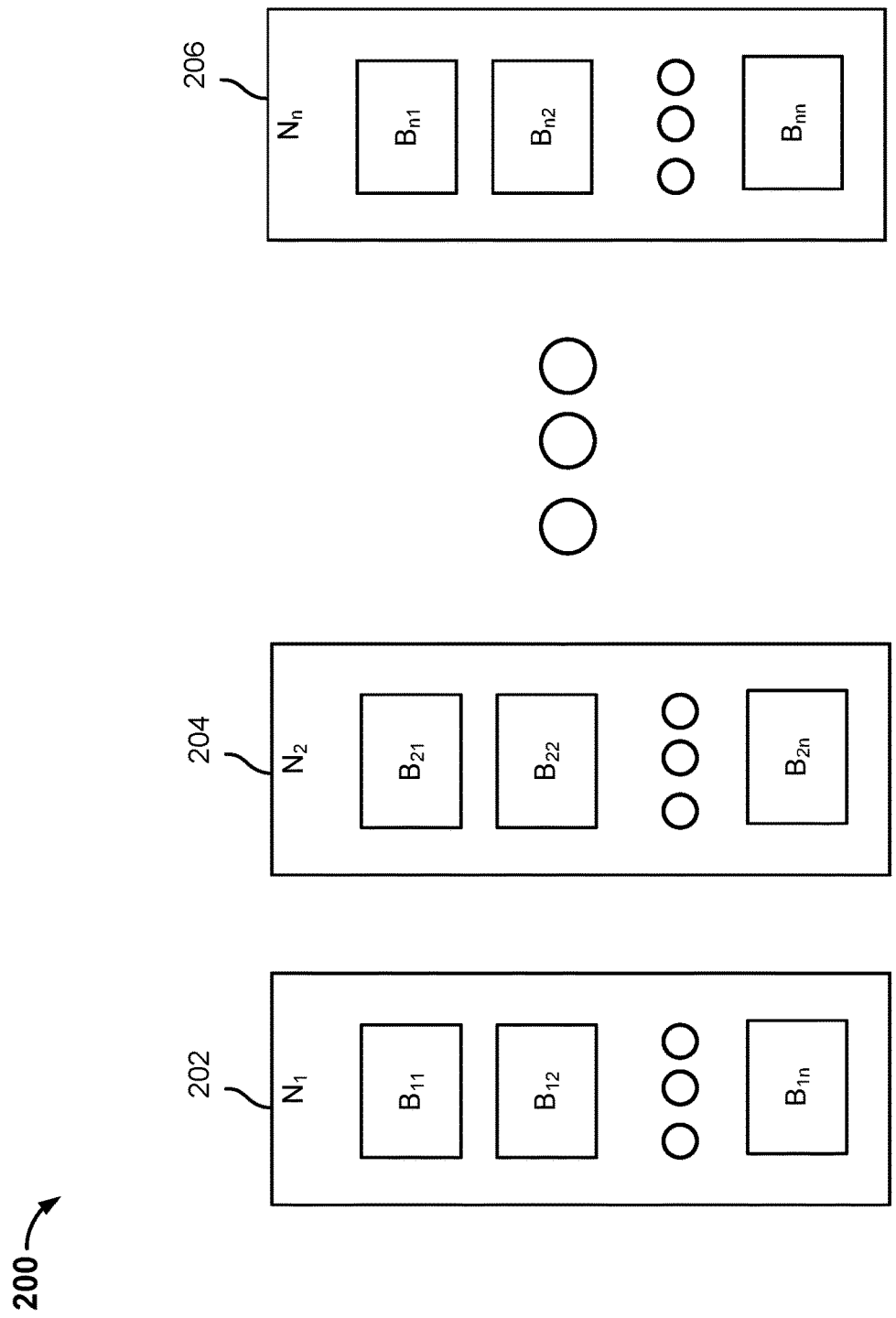
FIG. 2A is a diagram illustrating an embodiment of storage nodes.

FIG. 2A is a diagram illustrating an embodiment of storage nodes. In the example shown, storage nodes 200 may be implemented by a secondary storage system, such as secondary storage system 104.

Storage nodes 202, 204, 206 correspond to a first storage node, a second storage node, and an nth storage node. Each storage node stores a plurality of buckets. A bucket is configured to store a plurality of keys of the KVS. For example, storage node 202 is configured to store buckets $B_{11}, B_{12}, \ldots, B_{1n}$. Storage node 204 is configured to store buckets $B_{21}, B_{22}, \ldots, B_{2n}$. Storage node 206 is configured to store buckets $B_{n1}, B_{n2}, \ldots, B_{nn}$.

At least one storage node in the system may be designated as a backup node for the portion of the KVS that is stored on another storage node of the secondary storage system 104. For example storage node 202 stores buckets $B_{11}, B_{12}, \ldots, B_{1n}$. At least one copy of buckets $B_{11}, B_{12}, \ldots, B_{1n}$ may be stored on storage node 204, storage node 206, or any of the storage nodes between storage node 204 and storage node 206 (not shown). For example, bucket $B_{n2}$ may store the same keys as bucket $B_{11}$. This provides fault tolerance and consistency for the distributed computing system in the event node failure. Multiple copies of buckets may be stored across multiple storage nodes to increase the fault tolerance of the distributed computing system. In some embodiments, each bucket of the KVS is stored across a majority of the storage nodes. This also enables file operations associated with a selected bucket to proceed while the one or more content files associated with a selected bucket are being transferred to a target node.

Figure 2B:
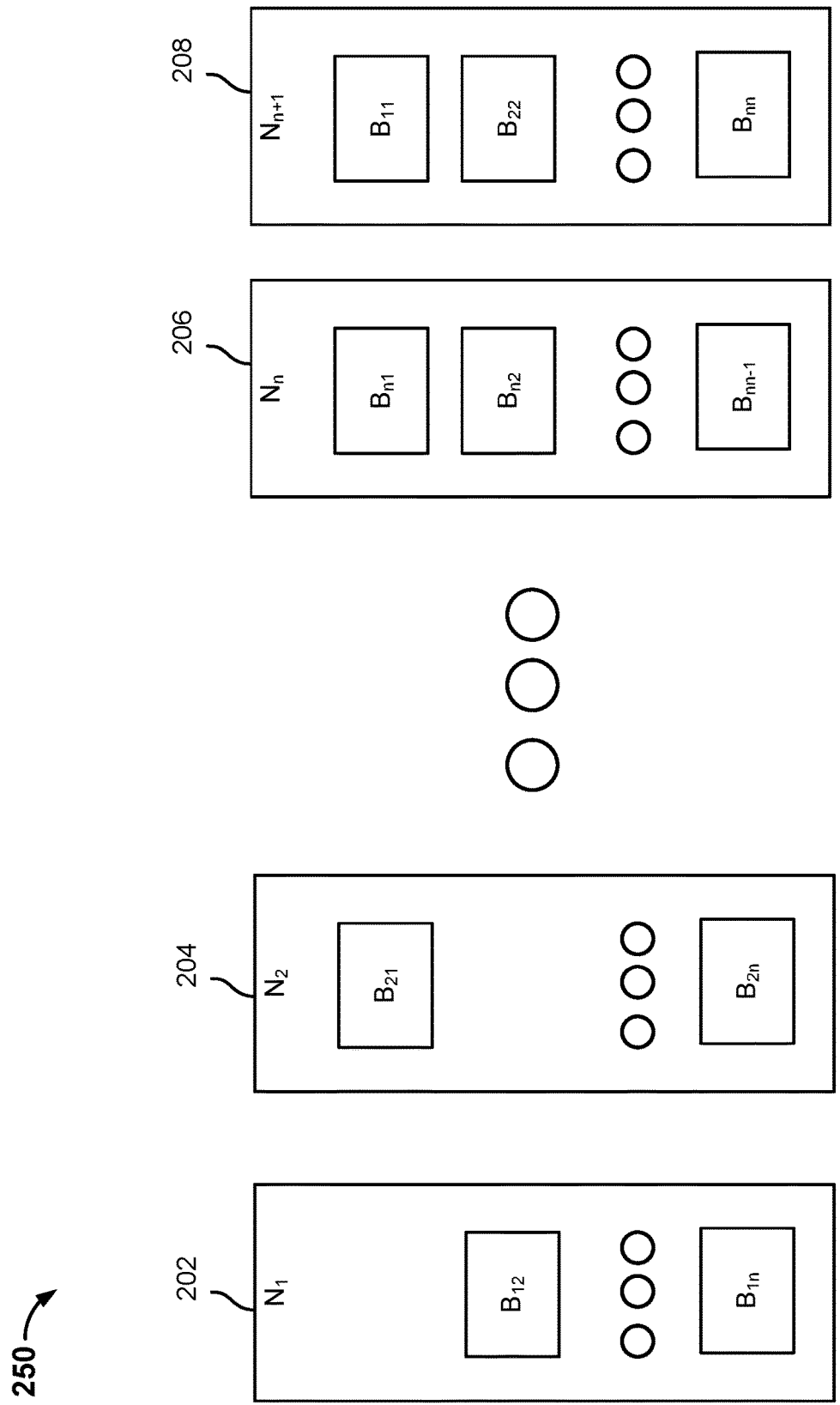
FIG. 2B is a diagram illustrating an embodiment of storage nodes.

FIG. 2B is a diagram illustrating an embodiment of storage nodes. In the example shown, storage nodes 250 may be implemented by a secondary storage system, such as secondary storage system 104.

Storage nodes 202, 204, 206 correspond to the same storage nodes depicted in FIG. 2A. FIG. 2B depicts a storage node being added to the secondary storage system. Storage node 208 may be added to secondary storage system to improve fault tolerance, load balancing, etc. of the secondary storage system. A portion the buckets stored on storage nodes 202, 204, 206, may be redistributed to storage node 208. In the example shown, bucket $B_{11}$ from storage node 202, bucket $B_{22}$ from storage node 204, and bucket $B_{nn}$ from storage node 206 have been migrated to storage node 208.

Figure 3:
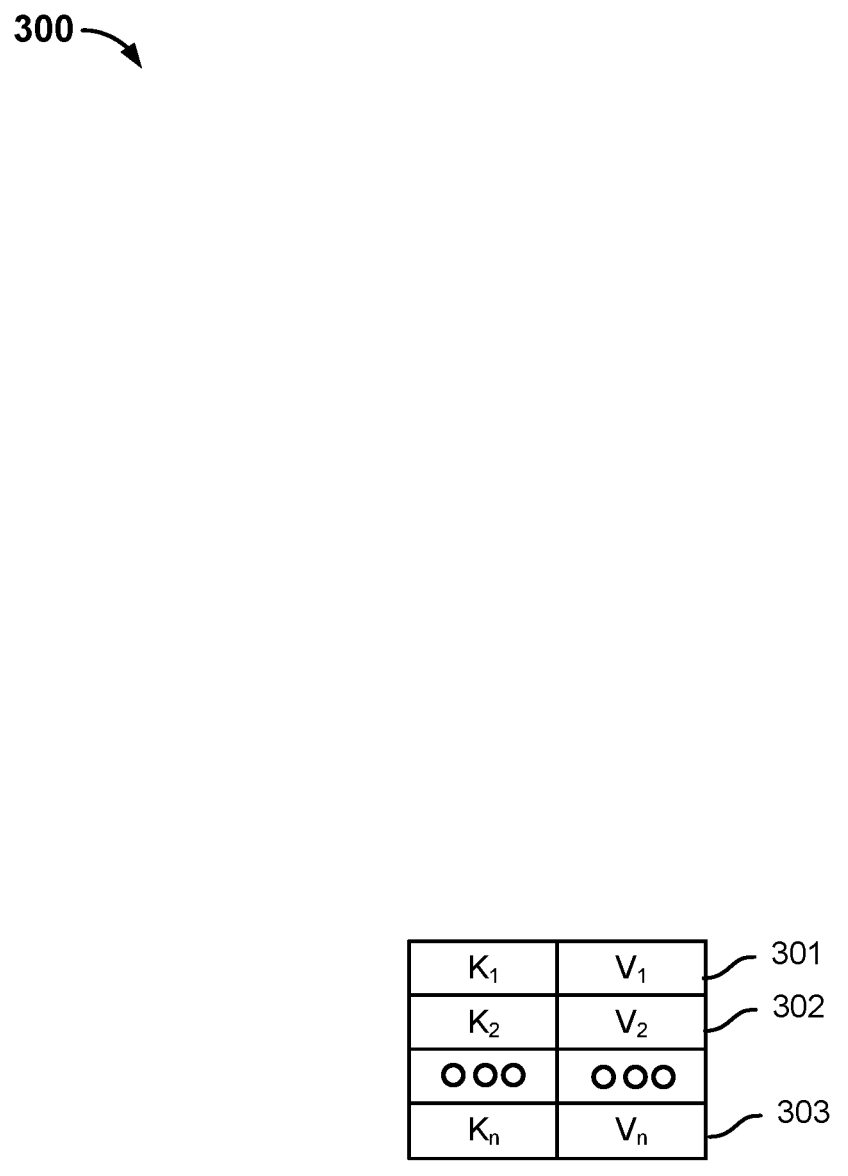

FIG. 3 is a diagram illustrating an embodiment of a bucket. In the example, bucket 300 may be implemented by a bucket, such as any of the buckets $B_{11}, B_{12}, \ldots, B_{1n}, B_{21}, B_{22}, \ldots, B_{2n}$, or $B_{n1}, B_{n2}, \ldots, B_{nn}$.

Bucket 300 is comprised of key-value pairs 301, 302, 303. Key-value pair 301 includes a first key $K_1$ and associated value $V_1$. Key-value pair 302 includes a second key $K_2$ and associated value $V_2$. Key-value pair 303 includes an nth key $K_n$ and associated value $V_n$. The key-value pairs may correspond to metadata associated with a content file (e.g., log sequence numbers (LSN), one or more file names, a creation date, offline/online status, etc.). Bucket 300 may correspond to a plurality of underlying database files. The database may be stored as one or more underlying database files. A bucket maps to one or more of the underlying database files of the database, that is, the key-value pairs of a bucket are stored in at least one of the underlying database files.

A key-value pair may be stored in a leaf node associated with a snapshot tree. The value of a key-value pair may be read by traversing a snapshot tree as described herein to the leaf node storing the key-value pair. The key of a leaf node may correspond to a brick number. A KVS may store the key-value pairs stored across the leaf nodes of one or more snapshot trees.

Figure 4:
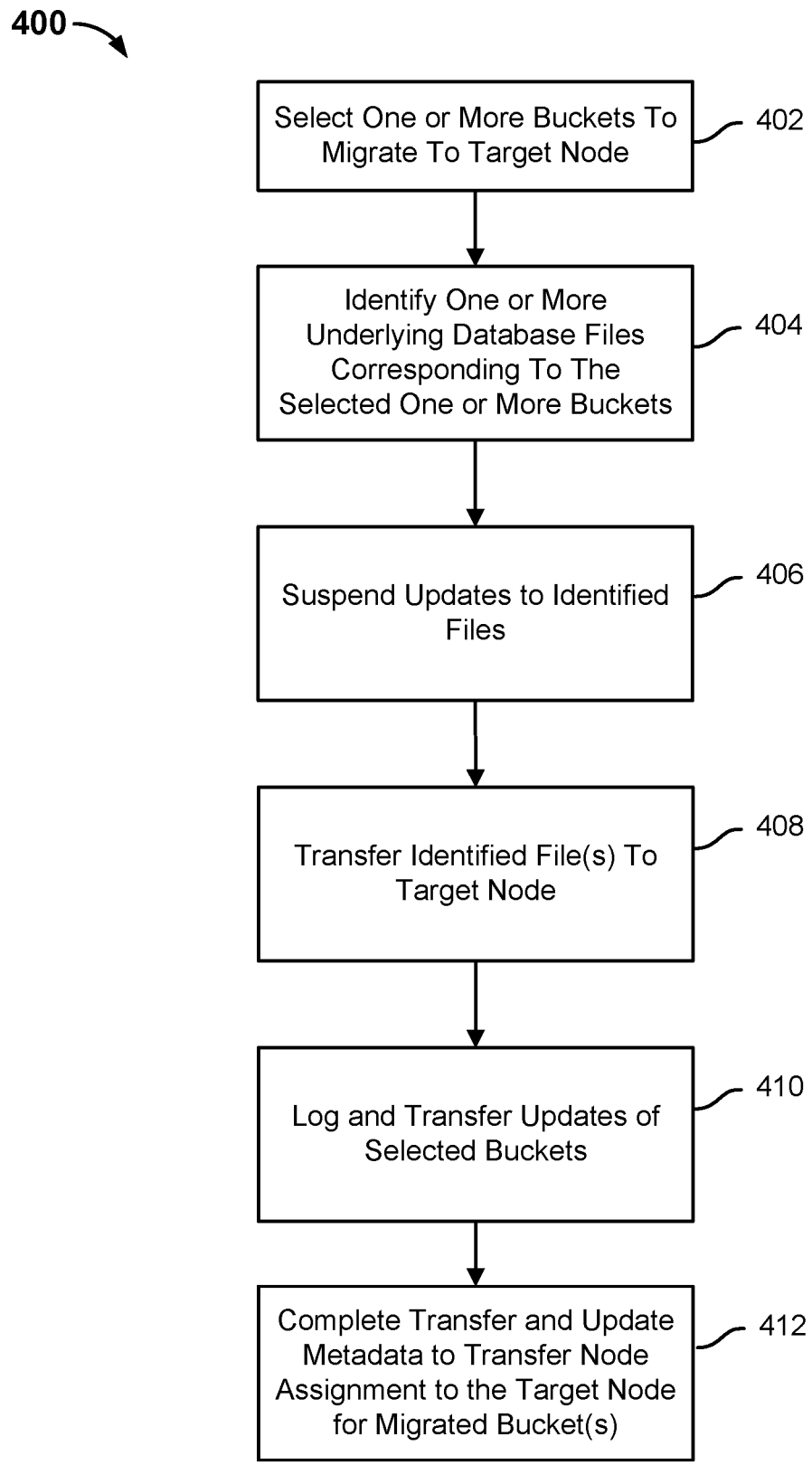
FIG. 4 is a flow chart illustrating an embodiment of a process for updating a target node of a distributed computing system.

FIG. 4 is a flow chart illustrating an embodiment of a process for updating a target node of a distributed computing system. In the example shown, process 400 may be performed by a secondary storage system, such as secondary storage system 104.

At 402, one or more buckets are selected to migrate to a target node. The target node may be added to a distributed computing system for various reasons, such as, to increase the fault tolerance of the distributed computing system, to expand the amount of data that the distributed computing system may back up, or to replace another node of the distributed computing system.

The distributed computing system is comprised of a plurality of storage nodes storing a portion of a KVS. The KVS is comprised of a plurality of key-value pairs. The KVS is organized into a plurality of buckets and managed using a database. The database may be stored as one or more underlying database files. A bucket maps to one of the underlying database files of the database, that is, the key-value pairs of a bucket are stored in one of the underlying database files. Each storage node is configured to store a plurality of buckets associated with a corresponding set of key-value pairs. The one or more buckets to be migrated to the target node may be selected from any of the existing storage nodes. In some embodiments, one or more buckets are selected based on one or more policies. For example, a bucket may be selected based on a frequency at which is bucket is accessed. A storage node having too many "hot" buckets (e.g., accessed at a frequency rate greater than a threshold) may have one or more of the "hot" buckets migrated to the target node. This may reduce the load on the storage node. In some embodiments, a storage node may be at capacity and have no more storage space to store additional key-value pairs. One or more buckets of the storage node may be selected and migrated to the target node. In other embodiments, the buckets are randomly selected.

At 404, one or more underlying database files corresponding to the selected one or more buckets are identified. The distributed computing system includes a map that associates a bucket with its underlying database file. The underlying database file stores the key-value pairs of the bucket.

Conventionally, the keys of a computing node to be redistributed may be identified by scanning a local database to identify all the keys associated with a bucket. A node may scan the database for a database file corresponding to the bucket and package the entries (e.g., the key-value pairs of the bucket) of the database file into a message. This database lookup requires a certain amount of time to be performed. The key-value pairs of a bucket may be transferred to the target node via one or more messages. The size of a message is finite. Key-value pairs of a bucket that are not included in an initial message may be included one or more additional messages that are sent to the target node. In response to receiving the messages that include the key-value pairs, the target node opens the message, reads the message, and updates its own database by writing the key-value pairs included in the message to its database. This process may take a long time to perform (e.g., hours) due to the large size of a database.

Identifying and sending the underlying database files instead of performing a database lookup and sending one or more messages that include the key-value pairs of a bucket reduces the amount of time needed to update a target node because amount of time needed to identify and send an underlying database file is less than the amount of time to scan a database for the key-value pairs included in a bucket, to package the key-value pairs in one or more messages, and to send the one or more messages to the target node.

At 406, updates to the one or more identified database files are suspended. The updates to the one or more identified database files are suspended to prevent changes to the one or more identified database files while they are being transferred. In some embodiments, the database is a logging database and updates are coalesced to the underlying database file. For example, updates to an underlying database file may be logged and the updates may be periodically applied to the underlying database file. In some embodiments, the outstanding updates are applied to the underlying database file before the updates are suspended and underlying database file is transferred to the target node. In other embodiments, the coalescing process is suspended, that is, the outstanding updates are not applied to the underlying database file before the updates are suspended, the underlying database file is transferred to the target node, and the outstanding updates associated with the one or more selected buckets are part of the first log. An outstanding update may modify and/or remove a key-value pair of a selected bucket.

In other embodiments, the database is not a logging database and maintains the database by creating one or more immutable database files. A log is created to capture updates to the one or more immutable database files created during the transfer. The log may be configured to log updates to the one or more identified buckets, that is, the updates to the key-value pairs of the one or more buckets. An update may modify and/or remove a key-value pair of a selected bucket. This may occur while an underlying database file corresponding to the one or more selected buckets is being transferred to the target node. The updates are logged to keep track of changes to the selected buckets without modifying the underlying immutable database files while the underlying database file is in transit.

At 408, the one or more identified database files are transferred to the target node. The one or more identified underlying database files may be directly copied from a storage of a first node to a storage of the target node. Transferring the one or more identified database files to the target node will allow the target node to update its local KVS without the source node having to scan a database for the key-value pairs included in a bucket, to package the key-value pairs in one or more messages, and to send the one or more messages to the target node. This reduces the amount of time needed by the distributed computing system to update the local KVS of the target node.

At 410, updates to the one or more selected buckets are logged and the log is transferred to the target node. A log may be generated that logs updates to the one or more selected buckets. An update may modify and/or remove a key-value pair of a selected bucket. This may occur while an underlying database file corresponding to the one or more selected buckets is being transferred to the target node. The updates are logged to keep track of changes to the selected buckets without modifying the underlying database file while the underlying database file is in transit. A number of log entries may accumulate while the one or more database files corresponding to the one or more selected buckets are being transferred to the target node. The changes, i.e., the log entries, may be applied to the one or more selected buckets after it has been transferred to the target node. This ensures that the local KVS of the target node is accurate.

At 412, the transfer of the one or more identified database files and the log is completed and metadata is updated to transfer node assignment to the target node for the one or more migrated buckets. The transferred database files are linked in a database of the target node to implement the one or more selected buckets in the second node. In response to receiving the one or more identified database files and the one or more logs, the target node is configured to update its own KVS. Updates to the one or more buckets associated with the identified database files may resume. A master table of a master storage node is updated to indicate that the target node should handle file operations associated with the one or more buckets corresponding to the one or more identified database files. The master table is updated to reflect the key-value pairs that are stored on the target node. The master storage node is configured to receive a file operation (e.g., write/read operation) and to direct the request to the storage node storing the data associated with the file operation (e.g., the key-value pair). The master node is configured to direct the request based on a master table that includes a list of all the key-value pairs stored on the distributed computing system. This ensures that the correct storage node handles the file operation. For example, without updating the master table, the storage node that previously stored the migrated buckets would still be responsible for file operations associated with the migrated buckets. The master table may also indicate whether the target node is a primary node to handle a file operation or a secondary node to handle the file operation. For example, the target node may be the primary node to handle a file operation associated with a key value pair or in the event the primary node goes offline, a secondary node to handle a file operation associated with the key value pair.

Figure 5:
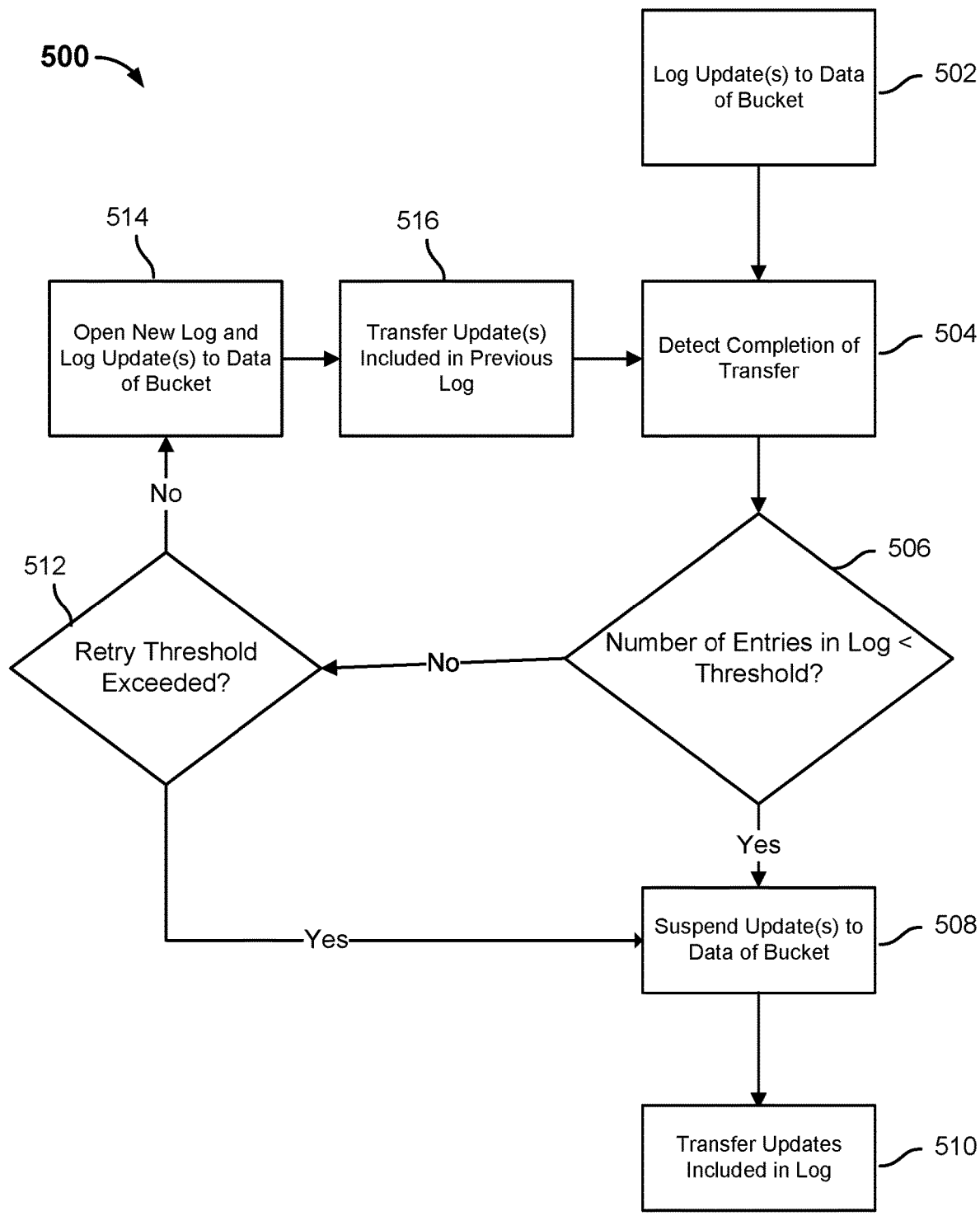
FIG. 5 is a flow chart illustrating an embodiment of a process for transferring logged updates to a target node.

FIG. 5 is a flow chart illustrating an embodiment of a process for transferring logged updates to a target node. In the example shown, process 500 may be performed by a secondary storage system, such as secondary storage system 104. In some embodiments, process 500 is implemented to perform all or some of step 410 of process 400.

At 502, one or more updates to the data associated with a bucket are logged. A bucket includes a plurality of key-value pairs and corresponds to a particular underlying database file. For example, a KVS and associated buckets are managed and stored using a database. The database may be stored as one or more underlying database files. A bucket maps to one of the underlying database files of the database, that is, the key-value pairs of a bucket are stored in one of the underlying database files. A value of one of the key-value pairs may be updated while a database file corresponding to the bucket is being transferred to a target node. The one or more updates are logged instead of modifying the underlying database file while the underlying database file is being transferred to ensure that a correct version of the underlying database file is provided to the target node.

At 504, a completion of a transfer is detected. In some embodiments, a completion of a transfer of one or more database files to a target node is detected. In other embodiments, a completion of a transfer of a log that includes one or more updates to the one or more buckets associated with the one or more transferred database files is detected.

At 506, it is determined whether a number of entries in the log are less than a threshold. In the event the number of entries in the log is less than the threshold, then process 500 proceeds to 508. In the event the number of entries in the log is not less than the threshold, then process 500 proceeds to 512. The number of entries in the log are compared to a threshold to determine if updating KVS of a target node would take too long. If the number of entries in the log is greater than or equal to the threshold, then updating a KVS of a target node would take too long. However, if the number of entries in the log is less than the threshold, then the amount of time to update the KVS of the target node is minimized because the amount of time that updates to the one or more selected buckets are suspended is minimized. For example, updating a KVS for a few log entries will not take the target node as long as updating the KVS for thousands of entries.

At 508, the one or more updates to the data associated with the one or more buckets corresponding to the one or more transferred database files are suspended. File operations associated with the one or more buckets corresponding to the one or more transferred database files will fail while the one or more updates are suspended. The updates to the data associated with the one or more buckets corresponding to the one or more transferred database files are suspended because the updates need to be transferred and applied to the KVS of the target node. The objective is to efficiently configure the distributed KVS to be in a consistent state while the amount of time that updates to the one or more buckets corresponding to the one or more transferred database files are suspended is minimized. The target node may be ready to handle file operations when its KVS is up-to-date. Not suspending updates and having the source node continue to log updates prevents the target node from being ready to handle file operations because the source node may have logged some updates to the buckets while a log is being transferred. Thus, the KVS of the target node may not be up-to-date and the distributed KVS is not in a consistent state.

At 510, the one or more updates included in the log are transferred to a target node. This allows the target node to have the latest set of updates and ensures that the target node is up-to-date with the most current version of the transferred buckets. Updates to the one or more selected buckets will be un-suspended after the one or more updates included in the log are transferred to the target node.

At 512, it is determined whether a retry threshold has been exceeded. A retry threshold has been exceeded in the event a new log has been opened more than a threshold number of times. In the event the retry threshold has not been exceeded, process 500 proceeds to 514. In the event the retry threshold has been exceeded, process 500 proceeds to 508. The process repeats itself until a retry threshold has been met. The retry threshold ensures that the database of the target node is up-to-date at some point-in-time with the source node, the overall database is in a consistent state at some point-in-time, and the source node is not in a never ending loop of generating and transferring logs.

At 514, a new log is opened and the one or more updates to the data associated with a bucket corresponding to the one or more transferred database files is logged. At 516, the one or more updates included in previous log are transferred to the target node.

Figure 6:
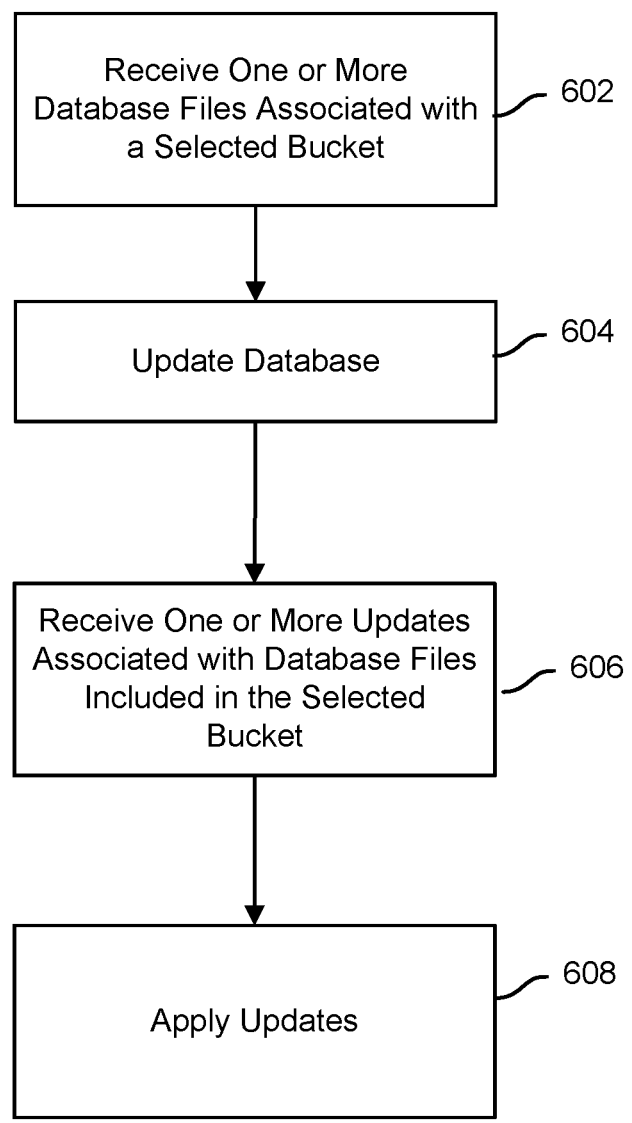
FIG. 6 is a flow chart illustrating an embodiment of a process for updating a key value store of a target node.

FIG. 6 is a flow chart illustrating an embodiment of a process for updating a key value store of a target node. In the example shown, process 600 may be performed by a secondary storage system, such as secondary storage system 104.

At 602, one or more underlying database files associated with one or more selected buckets are received and stored. The one or more underlying database files are configured to store a plurality of key-value pairs associated with the one or more selected buckets. A local KVS of the target node may be stored using a database.

At 604, the KVS of the target node is updated based on the one or more underlying database files. The one or more underlying database files include entries (e.g., key-value pairs) associated with one or more selected buckets. The KVS is updated to include the entries (e.g., $K_1=V_1$, $K_2=V_2$, $K_n=V_n$) included in the one or more selected buckets. Using the underlying database files to update the KVS of the target node is faster than conventional techniques.

Conventionally, the keys of a computing node to be redistributed may be identified by scanning a local database to identify all the keys associated with a bucket. A node may scan the database for a database file corresponding to the bucket and package the entries (e.g., the key-value pairs of the bucket) of the database file into a message. This database lookup requires a certain amount of time to be performed. The key-value pairs of a bucket may be transferred to the target node via one or more messages. The size of a message is finite. Key-value pairs of a bucket that are not included in an initial message may be included one or more additional messages that are sent to the target node. In response to receiving the messages that include the key-value pairs, the target node opens the message, reads the message, and updates its own database by writing the key-value pairs included in the message to its database. This process may take a long time to perform (e.g., hours) due to the large size of a database.

A map may be maintained that associates buckets with their underlying database file. Identifying an underlying database file and transferring the file to a target node is faster than the conventional techniques because a database does not need to be scanned to identify keys associated with a selected bucket. The target node may read the underlying database file and update its local KVS based on the underlying database file. For example, the underlying database file may be directly linked to the database without needing to extract individual entries of the database file to add to the database. In response to being linked to the underlying database file, the database may reference the underlying database file for a portion of the database. When a request for a KVP included in a bucket associated with the underlying database file, the database may direct the request to the underlying database file instead of a specific entry in the KVS.

At 606, one or more logs associated with the received database files are received. The one or more logs may include one or more updates to the one or more underlying database files that occurred while the one or more underlying database files were being transferred from a source node to the target node.

At 608, the one or more updates included in the one or more logs are applied to the KVS of the target node. An entry of the log may indicate that a value of the KVP is to be modified or deleted. The KVS is updated in a manner that corresponds to the one or more entries included in the one or more logs. Applying the entries included in the one or more logs to the KVS of the target node ensures that the KVS of the target node is up-to-date and ready to handle file operations. Subsequently, a master table of a master storage node may be updated to indicate that the target node should handle file operations associated with the one or more buckets corresponding to the one or more received underlying database files.

Figure 7A:
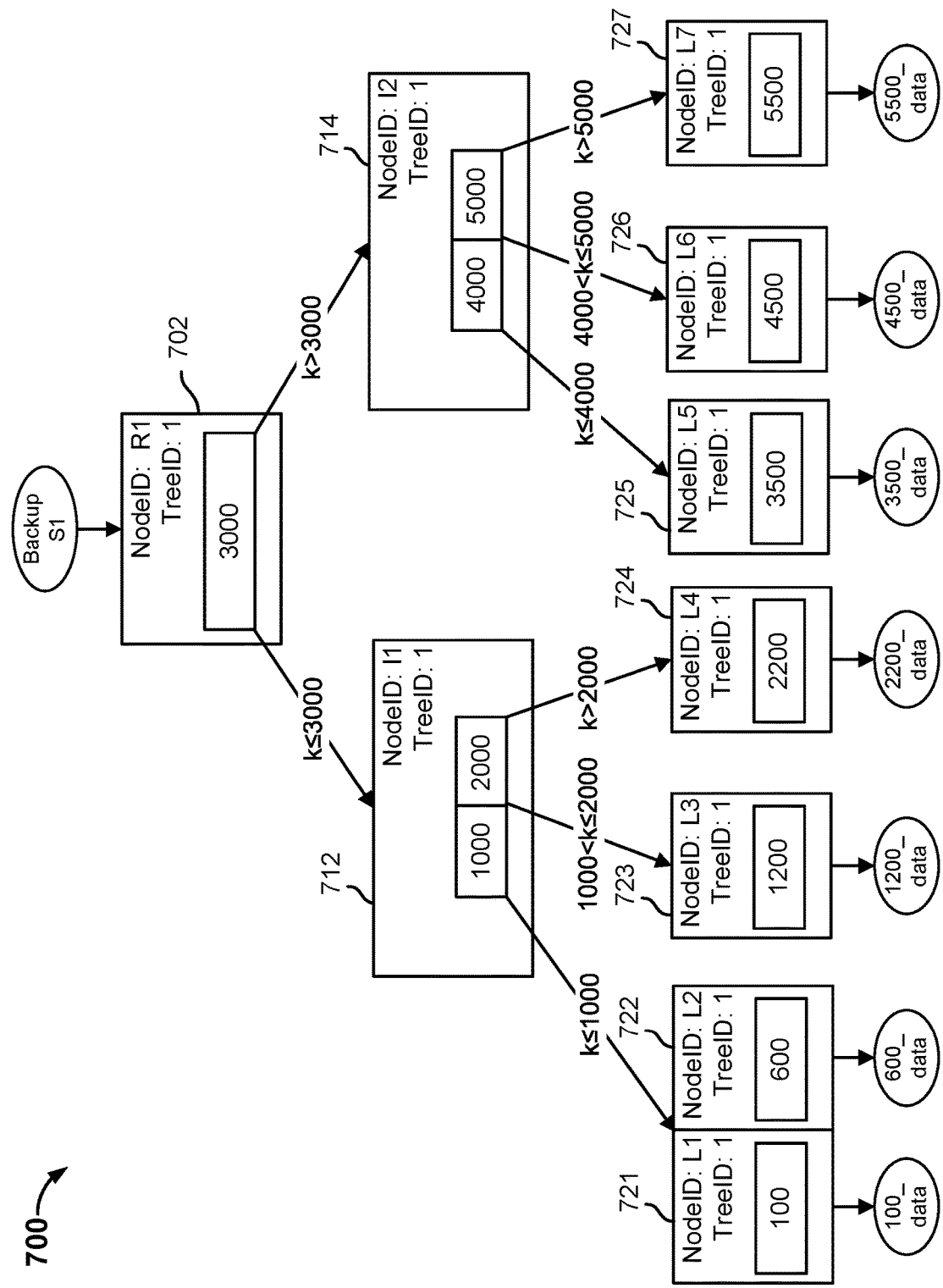
FIG. 7A is a diagram illustrating an embodiment of a tree data structure storing file system data.

FIG. 7A is a diagram illustrating an embodiment of a tree data structure storing file system data. The file system data stored in a distributed KVS may be organized using a tree structure. In the example shown, tree data structure 700 may be created by a file system manager, such as a file system manager 115 of secondary storage system 104. The file system data of a primary system, such as primary system 102 may be backed up to a secondary storage system, such as secondary storage system 104. The primary system may perform a backup snapshot to back up the file system data. The backup snapshot may correspond to a full backup snapshot or an incremental backup snapshot. The manner in which the file system data is stored in secondary storage system may be represented by a corresponding tree data structure, such as tree data structure 700.

In the example shown, tree data structure 700 is a snapshot tree that includes a root node 702, intermediate nodes 712, 714, and leaf nodes 721, 722, 723, 724, 725, 726, 727. Although tree data structure 700 includes one intermediate level between root node 702 and leaf nodes 721, 722, 723, 724, 725, 726, 727, there could be any number of intermediate levels in a snapshot tree. Tree data structure 700 may be a snapshot tree of file system data at a particular point in time t. The tree data structure may correspond to a backup snapshot that includes the file system data. For example, tree data structure 700 may correspond to "Backup S1" of file system data.

Root node 702 is associated with the snapshot of the file system data at a particular point in time t, i.e., a particular backup snapshot version. In some embodiments, the file system data is metadata for a distributed file system and may include information, such as file size, directory structure, file permissions, physical storage location of the files, etc.

A root node is the root of a snapshot tree and may include pointers to one or more other nodes. Each pointer includes a range of numerical and sorted data keys that can be found by following that particular pointer. An intermediate node is a node to which another node points (e.g., root node, other intermediate node) and includes one or more pointers to one or more other nodes. A leaf node is a node at the bottom of a snapshot tree. In some embodiments, a leaf node is a node to which another node points, but does not include a pointer to any other node. In other embodiments, a leaf node is a node to which another node points and includes a pointer to the root node of another snapshot tree (e.g., file tree). A leaf node may store key-value pairs of file system data. A data key k is a lookup value by which a particular leaf node may be accessed. A content file may be comprised of one or more data blocks. The content file may be divided into a plurality of equal size blocks called bricks. The lookup value may correspond to a brick number. For example, "100" is a data key that may be used to lookup "100_data" of leaf node 721. Examples of values stored by a leaf node include, but are not limited to, file size, directory structure, file permissions, physical storage locations of the files, etc. The value stored by a leaf node is stored in a key-value store. In some embodiments, the key-value pairs associated with a snapshot tree are stored in a bucket of a KVS. In other embodiments, the key-value pairs associated with a snapshot tree are stored in more than bucket of the KVS. A leaf node may store a data key k and a pointer to a location that stores the value associated with the data key. The value may correspond to a data brick comprising one or more data blocks.

A root node or an intermediate node may include one or more node keys. The node key may be an integer value or a non-integer value. The node key may correspond to a brick number. Each node key indicates a division between the branches of the node and indicates how to traverse the tree data structure to find a leaf node, i.e., which pointer to follow. For example, root node 702 may include a node key of "3000." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "100," "600," "1200," or "2200," the first branch of root node 702 would be traversed to intermediate node 712 because the data keys of "100," "600," "1200," and "2200" are less than or equal to the node key "3000." To find a leaf node storing a value associated with a data key of "3500," "4500," or "5500," the second branch of root node 702 would be traversed to intermediate node 714 because data keys "3500," "4500," and "5500" are greater than the node key of "3000."

In some embodiments, a hash function may determine which branch of a node with which the non-numerical data key is associated. For example, a hash function may determine that a first bucket is associated with a first branch of a node and a second bucket is associated with a second branch of the node.

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "3000." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 702 includes a pointer to intermediate node 712 and a pointer to intermediate node 714. Root node 702 includes a NodeID of "R1" and a TreeID of "1." The NodeID identifies the name of the node. The TreeID identifies the backup snapshot/view with which the node is associated. When a change is made to data associated with a leaf node as described with respect to FIGS. 7B, 7C, and 7D, the TreeID may be used to determine which backup snapshot the change is associated (i.e., when did the change occur).

Root node 702 includes a node key that divides a set of pointers into two different subsets. Leaf nodes (e.g., L1, L2, L3, L4) with a data key k that is less than or equal to the node key are associated with a first branch and leaf nodes (e.g., L5, L6, L7) with a data key k that is greater than the node key are associated with a second branch. Leaf nodes with a data key of "100," "600," "1200," or "2200" may be found by traversing tree data structure 700 from root node 202 to intermediate node 212 because the data keys have a value that is less than or equal to the node key. Leaf nodes with a data key of "3500," "4500," or "5500" may be found by traversing tree data structure 700 from root node 702 to intermediate node 714 because the data keys have a value that is greater than the node key.

Root node 702 includes a first set of pointers. The first set of pointers associated with a data key less than the node key (e.g., "100", "600," or "1200") indicates that traversing tree data structure 700 from root node 702 to intermediate node 712 will lead to a leaf node with a data key of "100," "600," "1200," or "2200." Intermediate node 714 includes a second set of pointers. The second set of pointers associated with a data key greater than the node key indicates that traversing tree data structure 700 from root node 702 to intermediate node 714 will lead to a leaf node with a data key of "3500," "4500," or "5500."

Intermediate node 712 includes pointers to leaf nodes 721, 722, 723, 724. Intermediate node 712 includes a NodeID of "I1" and a TreeID of "1." Intermediate node 712 includes a first node key of "1000" and a second node key of "2000." The data key k for leaf nodes 721, 722 is a value that is less than or equal to the first node key. The data key k for leaf node 723 is a value that is greater than the first node key and less than or equal to the second node key. The data key k for leaf node 724 is a value that is greater than the second node key. The pointer to leaf nodes 721, 722 indicates that traversing tree data structure 700 from intermediate node 712 to leaf nodes 721, 722 will lead to the node with a data key of "100" or "600." The pointer to leaf node 723 indicates that traversing tree data structure 700 from intermediate node 712 to leaf node 723 will lead to the node with a data key of "1200." The pointer to leaf node 724 indicates that traversing tree data structure 700 from intermediate node 712 to leaf node 724 will lead to the node with a data key of "2200."

Intermediate node 714 includes pointers to leaf nodes 725, 726, 727. Intermediate node 712 includes a NodeID of "I2" and a TreeID of "1." Intermediate node 714 includes a first node key of "4000" and a second node key of "5000." The data key k for leaf node 725 is a value that is less than or equal to the first node key. The data key k for leaf node 726 is a value that is greater than the first node key and less than or equal to the second node key. The data key k for leaf node 727 is a value that is greater than the second node key. The pointer to leaf node 725 indicates that traversing tree data structure 700 from intermediate node 714 to leaf node 725 will lead to the node with a data key of "3500." The pointer to leaf node 726 indicates that traversing tree data structure 700 from intermediate node 714 to leaf node 726 will lead the node with a data key of "4500." The pointer to leaf node 727 indicates that traversing tree data structure 700 from intermediate node 714 to leaf node 727 will lead the node with a data key of "5500."

A content file may be comprised of a plurality of data blocks. The content file may be divided into a plurality of fixed size data blocks called bricks. Information associated with a brick for a content file may be kept in the tree data structure. For example, a leaf node may correspond to a brick and include a pointer to a location of the corresponding one or more data blocks stored in the brick. Given an offset in a content file, the brick number may be determined by dividing the file offset by a brick size. The brick number may correspond to a data key k for a leaf node.

Leaf node 721 includes a data key of "100," which may correspond to brick number 100. Leaf node 721 may include a pointer to the corresponding data brick "100_data." In other embodiments, leaf node 721 includes a pointer to a file tree storing the metadata associated "100_data." The file tree is a snapshot tree, but a leaf node of the file tree includes a pointer or an identifier for a brick storing one or more data chunks associated with the content file. The metadata associated with a file may be stored in a file tree in the event the metadata associated with the file is greater than or equal to a threshold size. Leaf node 721 also includes NodeID of "L1" and a TreeID of "1." To view the data brick associated with a data key of "100," tree data structure 700 is traversed from root node 702 to intermediate node 712 to leaf node 721.

Leaf node 722 includes a data key of "600," which may correspond to brick number 600. Leaf node 722 may include a pointer to the corresponding data brick "600_data." In other embodiments, leaf node 722 includes a pointer to a file tree storing the metadata associated "600_data." The file tree is a snapshot tree, but a leaf node of the file tree includes a pointer or an identifier for a brick storing one or more data chunks associated with the content file. The metadata associated with a content file may be stored in a file tree in the event the metadata associated with the content file is greater than or equal to a threshold size. Leaf node 722 also includes NodeID of "L2" and a TreeID of "1." To view the data brick associated with a data key of "600," tree data structure 200 is traversed from root node 702 to intermediate node 712 to leaf node 722.

Leaf node 723 includes a data key of "1200," which may correspond to brick number 1200. Leaf node 723 may include a pointer to the corresponding data brick "1200_data." In other embodiments, leaf node 723 includes a pointer to a file tree storing the metadata associated "1200_data." The file tree is a snapshot tree, but a leaf node of the file tree includes a pointer or an identifier for a brick storing one or more data chunks associated with the content file. The metadata associated with a content file may be stored in a file tree in the event the metadata associated with the content file is greater than or equal to a threshold size. Leaf node 723 also includes NodeID of "L3" and a TreeID of "1." To view the data brick associated with a data key of "1200," tree data structure 700 is traversed from root node 702 to intermediate node 712 to leaf node 723.

Leaf node 724 includes a data key of "2200," which may correspond to brick number 2200. Leaf node 724 may include a pointer to the corresponding data brick "2200_data." In other embodiments, leaf node 724 includes a pointer to a file tree storing the metadata associated "2200_data." The file tree is a snapshot tree, but a leaf node of the file tree includes a pointer or an identifier for a brick storing one or more data chunks associated with the content file. The metadata associated with a content file may be stored in a file tree in the event the metadata associated with the content file is greater than or equal to a threshold size. Leaf node 724 also includes NodeID of "L4" and a TreeID of "1." To view the data brick associated with a data key of "2200," tree data structure 700 is traversed from root node 702 to intermediate node 712 to leaf node 724.

Leaf node 725 includes a data key of "3500," which may correspond to brick number 3500. Leaf node 725 may include a pointer to the corresponding data brick "3500_data." In other embodiments, leaf node 725 includes a pointer to a file tree storing the metadata associated "3500_data." The file tree is a snapshot tree, but a leaf node of the file tree includes a pointer or an identifier for a brick storing one or more data chunks associated with the content file. The metadata associated with a content file may be stored in a file tree in the event the metadata associated with the content file is greater than or equal to a threshold size. Leaf node 725 also includes NodeID of "L5" and a TreeID of "1." To view the data brick associated with a data key of "3500," tree data structure 700 is traversed from root node 702 to intermediate node 714 to leaf node 725.

Leaf node 726 includes a data key of "4500," which may correspond to brick number 4500. Leaf node 726 may include a pointer to the corresponding data brick "4500_data." In other embodiments, leaf node 726 includes a pointer to a file tree storing the metadata associated "4500_data." The file tree is a snapshot tree, but a leaf node of the file tree includes a pointer or an identifier for a brick storing one or more data chunks associated with the content file. The metadata associated with a content file may be stored in a file tree in the event the metadata associated with the content file is greater than or equal to a threshold size. Leaf node 726 also includes NodeID of "L6" and a TreeID of "1." To view the data brick associated with a data key of "4500," tree data structure 700 is traversed from root node 702 to intermediate node 714 to leaf node 726.

Leaf node 727 includes a data key of "5500," which may correspond to brick number 5500. Leaf node 727 may include a pointer to the corresponding data brick "5500_data." In other embodiments, leaf node 722 includes a pointer to a file tree storing the metadata associated "5500_data." The file tree is a snapshot tree, but a leaf node of the file tree includes a pointer or an identifier for a brick storing one or more data chunks associated with the file. The metadata associated with a content file may be stored in a file tree in the event the metadata associated with the content file is greater than or equal to a threshold size. Leaf node 727 also includes NodeID of "L7" and a TreeID of "1." To view the data brick associated with a data key of "5500," tree data structure 700 is traversed from root node 702 to intermediate node 714 to leaf node 727.

Figure 7B:
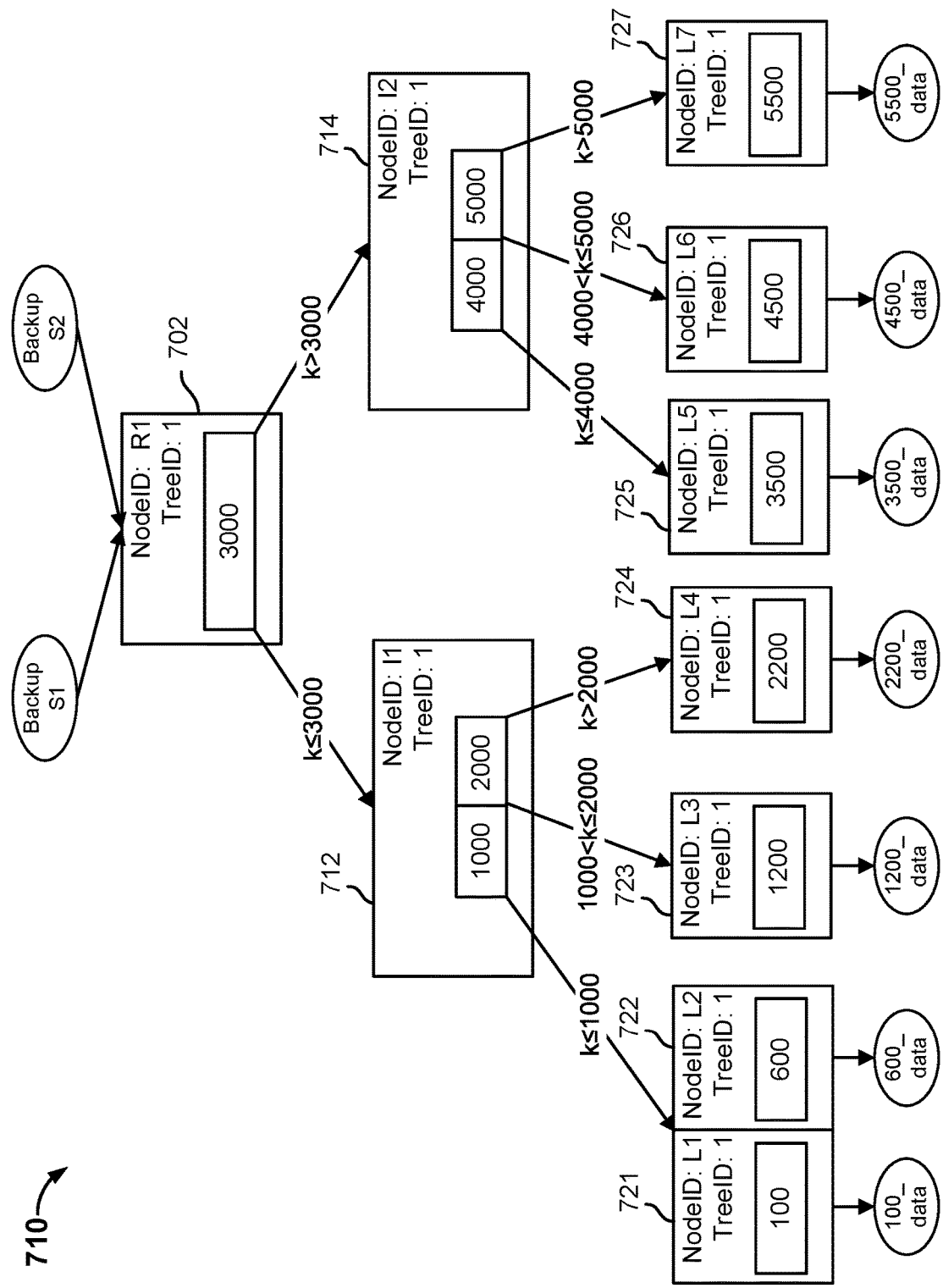
FIG. 7B is a diagram illustrating an embodiment of cloning a snapshot tree of a tree data structure.

FIG. 7B is a diagram illustrating an embodiment of cloning a snapshot tree of a tree data structure. In some embodiments, tree data structure 710 may be created by a file system manager, such as file system manager 115 of secondary storage system 104. The file system data of a primary system, such as primary system 102, may be backed up to a secondary storage system, such as secondary storage system 104. A subsequent backup snapshot may correspond to a full backup snapshot or an incremental backup snapshot. The manner in which the file system data corresponding to the subsequent backup snapshot is stored in secondary storage system may be represented by a tree data structure. The tree data structure corresponding to the subsequent backup snapshot is created by cloning a snapshot tree associated with a last backup. The tree data structure may be used to capture different versions of backup snapshots. The tree data structure allows a chain of snapshot trees corresponding to different versions of backup snapshots (i.e., different snapshot tree versions) to be linked together by allowing a node of a later version of a snapshot tree to reference a node of a previous version of a snapshot tree (e.g., a "snapshot tree forest"). For example, a root node or an intermediate node of the second snapshot tree corresponding to the second backup snapshot may reference an intermediate node or leaf node of the first snapshot tree corresponding to a first backup snapshot.

In the example shown, tree data structure 710 includes root node 702, intermediate nodes 712, 714, and leaf nodes 721, 722, 723, 724, 725, 726, and 727. Root node 702, intermediate nodes 712, 714, and leaf nodes 721, 722, 723, 724, 725, 726, and 727 are associated with a last backup snapshot, for example, "Backup S1." When a new backup snapshot is performed, e.g., "Backup S2," a clone of a last snapshot tree is generated. The clone of the last snapshot tree may be generated by causing the new backup snapshot to point to a root node associated with the last backup snapshot. In the example shown, the new backup "Backup S2" initially points to root node 702, which is the root node associated with the last backup snapshot "Backup S1."

Figure 7C:
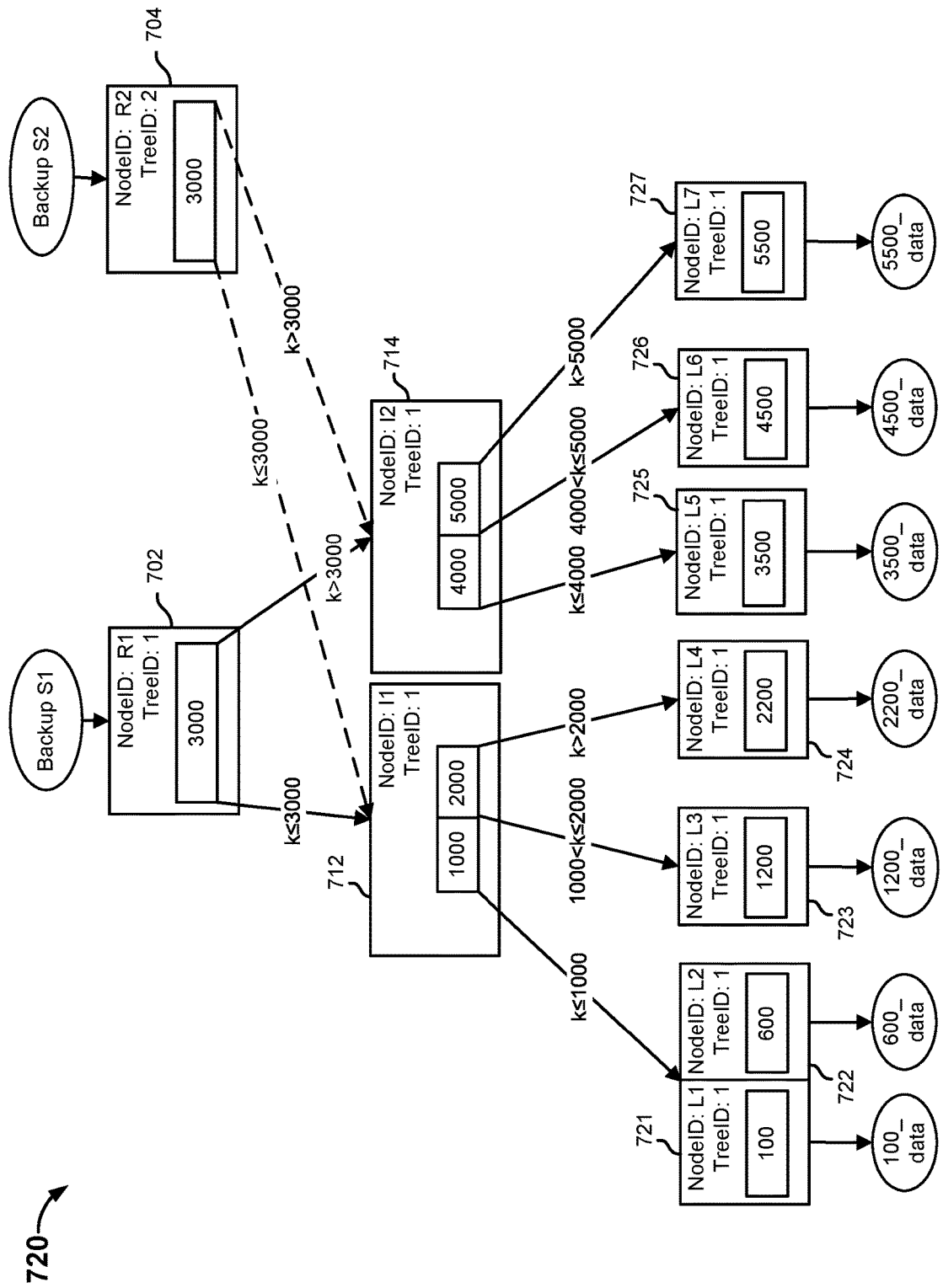
FIG. 7C is a diagram illustrating an embodiment of a modified cloned snapshot tree.

FIG. 7C is a diagram illustrating an embodiment of a modified cloned snapshot tree. In the example shown, tree data structure 720 may be modified by a file system manager, such as file system manager 115. One or more content files stored on a primary system may be added, modified, and/or deleted since a last backup snapshot. A subsequent backup snapshot corresponding to the one or more changes to the one or more content files may be performed after the last backup and stored at a secondary storage system, such as secondary storage system 104. The one or more changes to the one or more content files included in the subsequent backup snapshot may be represented in a corresponding snapshot tree. The one or more changes since a last backup snapshot may be represented in a snapshot tree by initially cloning the snapshot tree corresponding to the last backup, for example, as shown above in FIG. 7B.

The cloned snapshot tree may be modified in a manner that corresponds to the one or more changes to the primary system since the last backup snapshot. To indicate that the one or more changes to the primary system are associated with a subsequent backup snapshot and not associated with the last backup snapshot, a new root node is created. The new root node initially includes the set of pointers included in the root node associated with the last backup snapshot, that is, the new root node includes one or more pointers to an intermediate node or leaf node associated with a previous snapshot tree. However, the new root node includes a view identifier (e.g., TreeID) that is different than the view identifier (e.g., TreeID) of the previous root node. In the example shown, root node 704 has been created and includes pointers to intermediate nodes 712, 714. Root node 704 includes a NodeID of "R2" and a TreeID of "2."

Figure 7D:
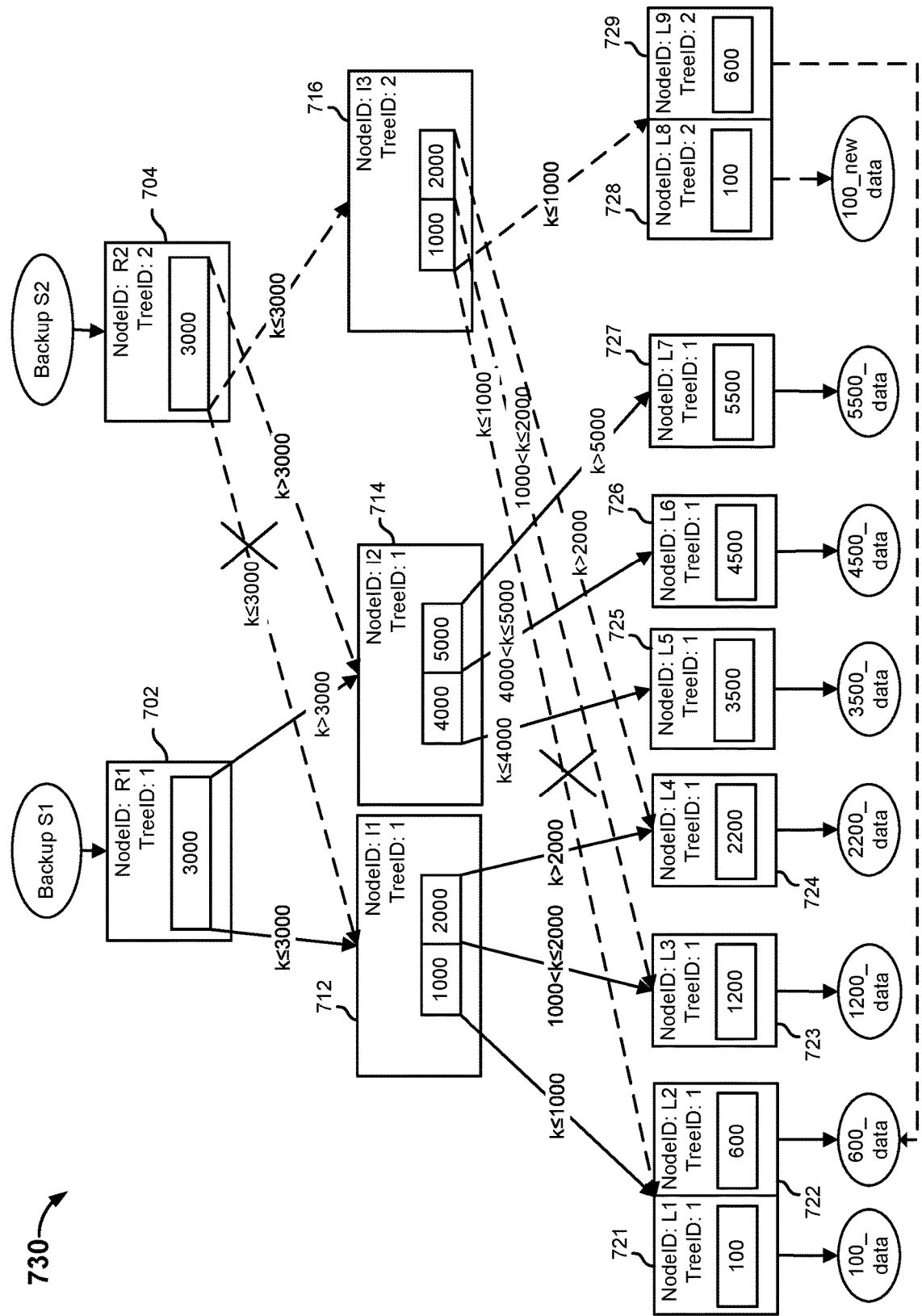
FIG. 7D is a diagram illustrating an embodiment of a modified cloned snapshot tree.

FIG. 7D is a diagram illustrating an embodiment of a modified cloned snapshot tree. In the example shown, tree data structure 730 may be modified by a file system manager, such as file system manager 115.

The one or more changes to the primary system since the last backup snapshot may include a modification to a data block. For example, a data value included in the data block may have been modified. The data block modification may be represented in the tree data structure. A data brick comprises the modified data block. The snapshot tree may be modified to indicate that the data brick comprising the modified data block has changed.

In the example shown, the data of "100_data" has been modified to "100_new data" since the last backup snapshot. The value of "100_data" may include a data brick identifier, a pointer to a file tree, metadata associated with a content file, etc. the value of "100_new data" may include a different brick identifier, a pointer to a different file tree, modified metadata associated the content file, etc. The snapshot tree corresponding to the subsequent backup snapshot is modified to reflect the modification. As described above, a clone of the last snapshot tree corresponding to the last backup snapshot is performed to generate a snapshot tree corresponding to a subsequent backup snapshot. A new root node corresponding to the subsequent backup snapshot is generated. The new root node includes the same pointers as the root node associated with the last backup snapshot. To modify the snapshot tree associated with the subsequent backup snapshot to reflect that the value of "100_data" has been modified to "100_new data," the file system manager traverses the snapshot tree associated the subsequent backup snapshot to identify the leaf node associated with the value "100_data." The file system manager starts at root node 704 because that is the root node of the snapshot tree associated with the subsequent backup snapshot. The file system manager traverses tree data structure 730 until it reaches a target node, in this example, leaf node 721. The file system manager compares the view identifier at each traversed intermediate node and leaf node with the view identifier of the root node. In the event the view identifier of a node matches the view identifier of the root node, the file system manager proceeds to the next node. In the event the view identifier of a node does not match the view identifier of the root node, a shadow copy of the node with the non-matching view identifier is made.

For example, to reach a leaf node with a data key of "100," the file system manager begins at root node 704 and proceeds to intermediate node 712. The file system manager compares the view identifier of intermediate node 712 with the view identifier of root node 704, determines that the view identifier of intermediate node 712 does not match the view identifier of root node 704, and creates a copy of intermediate node 712. The intermediate node copy 716 includes the same set of pointers as intermediate node 712, but includes a view identifier of "2" to match the view identifier of root node 704. The file system manager updates a set of pointers of root node 704 to point to intermediate node 716 instead of pointing to intermediate node 712. The file system manager traverses tree data structure 730 from intermediate node 716 to leaf node 721, determines that the view identifier of leaf node 721 does not match the view identifier of root node 704, and creates a copy of leaf node 721. Leaf node copy 728 includes the same view identifier as root node 704, has a new datakey of "100," and includes a pointer to a location of the value of "100 new data." The file system manager updates a pointer of intermediate node 716 to point to leaf node 728 instead of pointing to leaf node 721.

In some embodiments, the file system manager creates a shadow copy of one or more nodes associated a pointer. For example, the file system manager traversed tree data structure 740 from intermediate node 716 to leaf node 721. The file system manager may create a shadow copy of the one or more nodes to which intermediate node 716 points when k≤1000 (e.g., leaf nodes 721, 721).

Figure 7E:
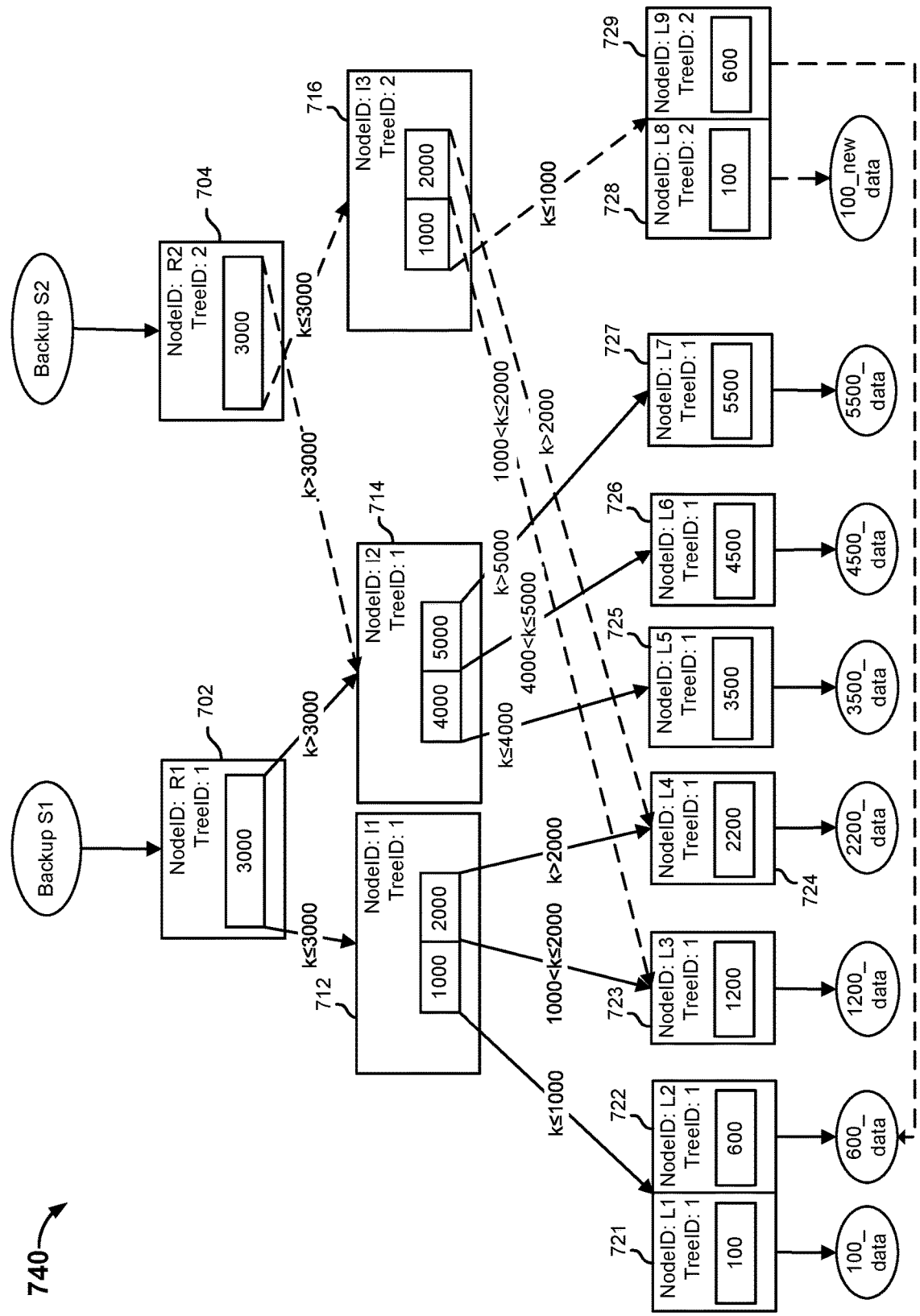
FIG. 7E is a block diagram illustrating an embodiment of a modified snapshot tree of a tree data structure.

FIG. 7E is a block diagram illustrating an embodiment of a modified snapshot tree of a tree data structure. The tree data structure 740 shown in FIG. 7E illustrates a result of the modifications made to tree data structure 730 as described with respect to FIG. 7D.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a first storage node configured to:
determine one or more underlying database files that correspond to one or more selected buckets of key-value pairs;
directly copy to a second storage node the one or more underlying database files that correspond to one or more selected buckets of key-value pairs, wherein updates to the one or more underlying database files are suspended while the one or more underlying database files are being sent to the second storage node; and
the second storage node configured to:
receive the one or more underlying database files; and
update a local key-value store based on the one or more received underlying database files.

2. The system of claim 1, wherein the first storage node is configured to:
log the updates to the one or more underlying database files after the updates to the one or more database files are suspended while the one or more underlying database files are being sent to the second storage node; and
send the logged updates to the second storage node.

3. The system of claim 2, wherein the second storage node is configured to apply the logged updates to the one or more received underlying database files.

4. The system of claim 2, wherein the first storage node is configured to inspect a log after the one or more underlying database files are copied to the second storage node.

5. The system of claim 4, wherein the first storage node is configured to determine whether a number of entries included in the log is less than a threshold number of updates.

6. The system of claim 5, wherein in the event the number of entries included in the log is less than the threshold number of updates, the first storage node is configured to:
suspend updates to the one or more selected buckets of key-value pairs; and
send the log to the second storage node.

7. The system of claim 5, wherein in the event the number of entries included in the log is not less than the threshold number of updates, the first storage node is configured to determine whether a retry threshold has been exceeded.

8. The system of claim 7, wherein in the event the retry threshold has not been exceeded, the first storage node is configured to:
generate a new log; and
send the log to the second storage node.

9. The system of claim 7, wherein in the event the retry threshold has been exceeded, the first storage node is configured to:
suspend updates to the one or more selected buckets of key-value pairs; and
send the log to the second storage node.

10. The system of claim 1, wherein the first storage node is configured to suspend the updates to the one or more database files.

11. The system of claim 1, wherein the one or more selected buckets of key-value pairs correspond to one or more buckets of key-value pairs that are accessed at a frequency greater than a threshold.

12. The system of claim 1, wherein the second storage node is a new storage node associated within the system.

13. The system of claim 1, wherein the local key-value store is a log structured merge database.

14. The system of claim 1, wherein the first storage node is configured to update a master table that indicates which storage node of a plurality of storage nodes is to handle a file operation for a particular key-value pair.

15. The system of claim 14, wherein entries included in the master table that correspond to the key-value pairs included in the one or more selected buckets are updated to reference the second storage node in place of the first storage node.

16. A method, comprising:
   determining, by a first storage node, one or more underlying database files that correspond to one or more selected buckets of key-value pairs; and
   directly copying, from the first storage node to a second storage node, the one or more underlying database files that correspond to one or more selected buckets of key-value pairs,
   wherein updates to the one or more underlying database files are suspended while the one or more underlying database files are being sent to the second storage node,
   wherein the second storage node receives the one or more underlying database files and updates a local key-value store based on the one or more received underlying database files.

17. The method of claim 16, wherein the one or more selected buckets of key-value pairs correspond to one or more buckets of key-value pairs that are accessed at a frequency greater than a threshold.

18. The method of claim 16, further comprising:
   logging the updates to the one or more underlying database files after the updates to the one or more database files are suspended while the one or more underlying database files are being sent to the second storage node; and
   sending the logged updates to the second storage node.

19. The method of claim 18, wherein the second storage node applies the logged updates to the one or more received underlying database files.

20. A computer program product embodied in a non-transitory computer readable medium and comprising computer instructions for:
   determining, by a first storage node, one or more underlying database files that correspond to one or more selected buckets of key-value pairs; and
   directly copying, from the first storage node to a second storage node, the one or more underlying database files that correspond to one or more selected buckets of key-value pairs,
   wherein updates to the one or more underlying database files are suspended while the one or more underlying database files are being sent to the second storage node,
   wherein the second storage node receives the one or more underlying database files and updates a local key-value store based on the one or more received underlying database files.

* * * * *